United States Patent
Long

(10) Patent No.: US 10,678,732 B1
(45) Date of Patent: Jun. 9, 2020

(54) EXPANDED HOST DOMAINS IN PCIE FABRICS

(71) Applicant: Liqid Inc., Broomfield, CO (US)

(72) Inventor: Christopher R. Long, Colorado Springs, CO (US)

(73) Assignee: Liqid Inc., Broomfield, CO (US)

( * ) Notice: Subject to any disclaimer, the term of this patent is extended or adjusted under 35 U.S.C. 154(b) by 0 days.

(21) Appl. No.: 16/286,725

(22) Filed: Feb. 27, 2019

(51) Int. Cl.
*G06F 3/00* (2006.01)
*G06F 13/40* (2006.01)
*H04L 12/743* (2013.01)

(52) U.S. Cl.
CPC ........ *G06F 13/4022* (2013.01); *G06F 13/404* (2013.01); *H04L 45/7457* (2013.01); *G06F 2213/0026* (2013.01)

(58) Field of Classification Search
CPC .............. G06F 13/4022; G06F 13/404; G06F 2213/0026; H04L 45/7457
See application file for complete search history.

(56) References Cited

U.S. PATENT DOCUMENTS

| | | | | |
|---|---|---|---|---|
| 9,223,737 | B1* | 12/2015 | Serebrin | G06F 13/4022 |
| 10,411,995 | B2* | 9/2019 | Ye | H04L 45/021 |
| 2006/0149853 | A1* | 7/2006 | Shankara | H04L 45/00 |
| | | | | 709/238 |
| 2008/0092148 | A1* | 4/2008 | Moertl | G06F 12/1009 |
| | | | | 719/321 |
| 2014/0237156 | A1* | 8/2014 | Regula | G06F 21/85 |
| | | | | 710/314 |
| 2015/0127878 | A1* | 5/2015 | Regula | G06F 13/4022 |
| | | | | 710/316 |
| 2015/0319086 | A1* | 11/2015 | Tripathi | H04W 12/06 |
| | | | | 370/254 |
| 2015/0370665 | A1* | 12/2015 | Cannata | G06F 3/0685 |
| | | | | 714/4.11 |
| 2018/0131603 | A1* | 5/2018 | Ye | H04L 45/021 |
| 2018/0260352 | A1* | 9/2018 | Long | G06F 13/4022 |
| 2018/0322081 | A1* | 11/2018 | Breakstone | G06F 13/28 |

* cited by examiner

Primary Examiner — Jing-Yih Shyu

(57) ABSTRACT

Computing architectures, platforms, and systems are provided herein. In one example, a computing system is provided. The computing system includes a management processor configured to initiate a peripheral component interconnect express (PCIe) arrangement between a host processor and a plurality of PCIe devices over a PCIe fabric comprising one or more PCIe switches. The PCIe arrangement is established to detect a data transfer directed to an expanded address of a greater length than a destination field of the PCIe communications of the detected data transfer by using at least another portion of the PCIe communications to store a portion of the expanded address that is in excess of the length than the destination field of the PCIe communications, and route the detected data transfer over the PCIe fabric to a destination device associated with the expanded address.

20 Claims, 7 Drawing Sheets

EXPANDED HOST DOMAINS IN PCIE FABRICS

BACKGROUND

Computer systems typically include bulk storage systems, such as magnetic disk drives, optical storage devices, tape drives, or solid state storage drives, among other storage systems. As storage needs have increased in these computer systems, networked storage systems have been introduced which store large amounts of data in a storage environment physically separate from end user computer devices. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments.

However, as the densities of networked storage systems and remote computing systems increase, various physical limitations can be reached. These limitations include density limitations based on the underlying storage technology, such as in the example of large arrays of rotating magnetic media storage systems. These limitations can also include computing density limitations based on the various physical space requirements for network interconnect as well as the large space requirements for environmental climate control systems.

In addition to physical space limitations, these bulk storage systems have been traditionally limited in the number of devices that can be included per host, which can be problematic in storage environments where higher capacity, redundancy, and reliability is desired. These shortcomings can be especially pronounced with the increasing data storage and retrieval needs in networked, cloud, and enterprise environments.

Overview

Computing architectures, platforms, and systems are provided herein. In one example, a computing system is provided. The computing system includes a management processor configured to initiate a peripheral component interconnect express (PCIe) arrangement between a host processor and a plurality of PCIe devices over a PCIe fabric comprising one or more PCIe switches. The PCIe arrangement is established to detect a data transfer directed to an expanded address of a greater length than a destination field of the PCIe communications of the detected data transfer by using at least another portion of the PCIe communications to store a portion of the expanded address that is in excess of the length than the destination field of the PCIe communications, and route the detected data transfer over the PCIe fabric to a destination device associated with the expanded address.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
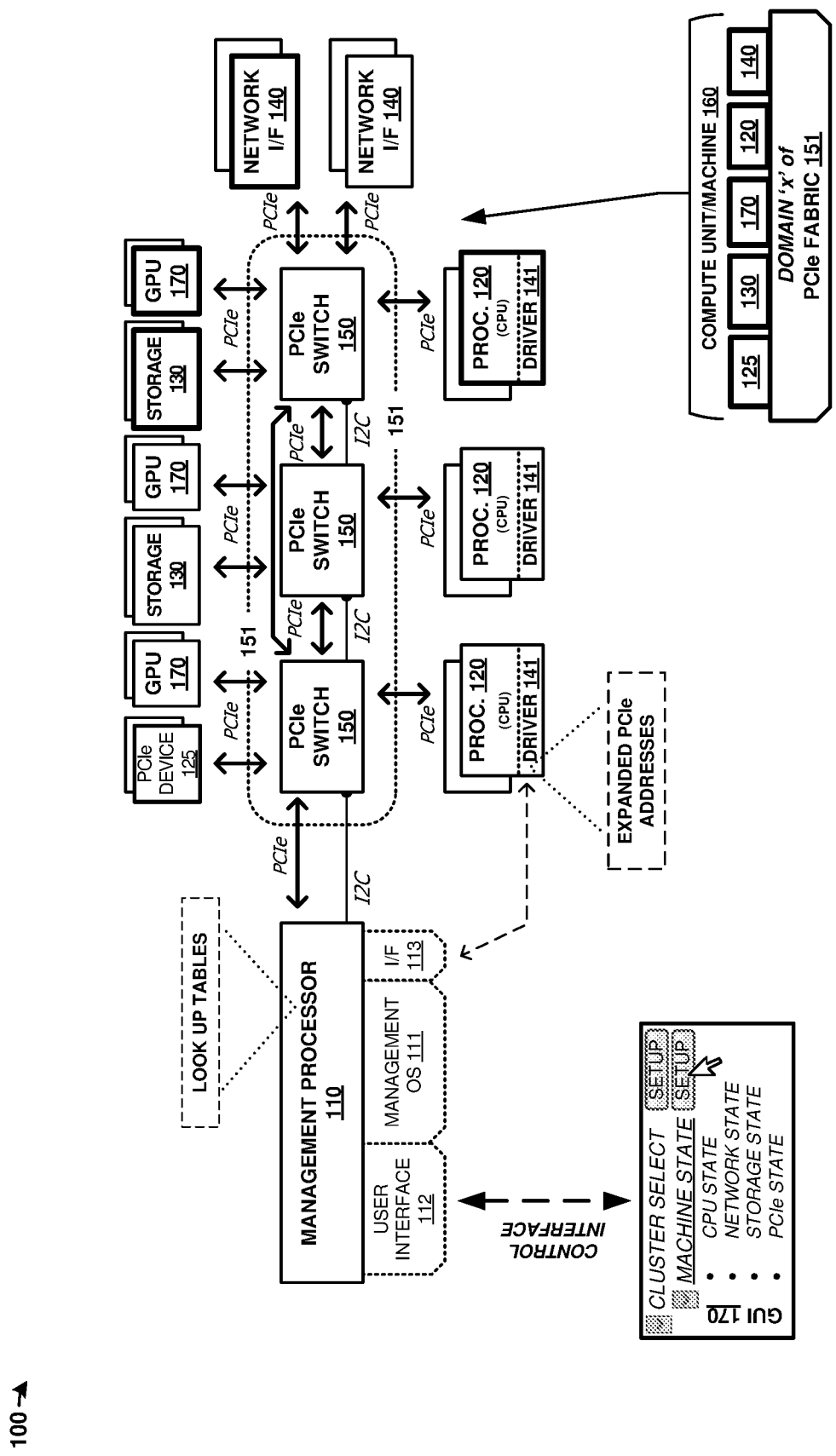
FIG. 1 is a diagram illustrating a computing platform in an implementation.

FIG. 1 is a system diagram illustrating computing platform 100. Computing platform 100 includes one or more management processors 110, and a plurality of physical computing components. The physical computing components include CPUs of processing modules 120, Peripheral Component Interconnect Express (PCIe) devices 125, storage units 130, network modules 140, PCIe switch modules 150, and graphics processing units (GPUs) 170. These physical computing components are communicatively coupled over PCIe fabric 151 formed from PCIe switch elements 150 and various corresponding PCIe links. PCIe fabric 151 configured to communicatively couple a plurality of physical computing components and establish compute units using logical partitioning within the PCIe fabric.

These compute units, referred to in FIG. 1 as machine(s) 160, can each be comprised of any number of CPUs of processing modules 120, PCIe devices 125, storage units 130, network interfaces 140 modules, and GPUs 170, including zero of any module. Some or all of the compute units 160 may be configured to provide expanded addressing functionality. Compute units 160 may utilize the expanded addressing functionality to, for example, include a larger number of devices that the normal addressing may allow.

The components of platform 100 can be included in one or more physical enclosures, such as rack-mountable units which can further be included in shelving or rack units. A predetermined number of components of platform 100 can be inserted or installed into a physical enclosure, such as a modular framework where modules can be inserted and removed according to the needs of a particular end user. An enclosed modular system, such as platform 100, can include physical support structure and enclosure that includes circuitry, printed circuit boards, semiconductor systems, and structural elements. The modules that comprise the components of platform 100 are insertable and removable from a rackmount style of enclosure. In some examples, the elements of FIG. 1 are included in a 2U chassis for mounting in a larger rackmount environment. It should be understood that the components of FIG. 1 can be included in any physical mounting environment, and need not include any associated enclosures or rackmount elements.

Once the components of platform 100 have been inserted into the enclosure or enclosures, the components can be coupled over the PCIe fabric and logically isolated into any number of separate compute units called "machines" or compute blocks. The PCIe fabric can be configured by management processor 110 to selectively route traffic among the components of a particular processor module and with external systems, while maintaining logical isolation between components not included in a particular processor module. In this way, a flexible "bare metal" configuration can be established among the components of platform 100. The individual compute blocks can be associated with external users or client machines that can utilize the computing, storage, network, or graphics processing resources of the compute block. Moreover, any number of compute blocks can be grouped into a "cluster" of compute blocks for greater parallelism and capacity. Although not shown in FIG. 1 for clarity, various power supply modules and associated power and control distribution links can also be included.

Turning now to the components of platform 100, management processor 110 can comprise one or more microprocessors and other processing circuitry that retrieves and executes software, such as user interface 112 and management operating system 111, from an associated storage system. Processor 110 can be implemented within a single processing device but can also be distributed across multiple processing devices or sub-systems that cooperate in executing program instructions. Examples of processor 110 include general purpose central processing units, application specific processors, and logic devices, as well as any other type of processing device, combinations, or variations thereof. In some examples, processor 110 comprises an Intel® or AMD® microprocessor, ARM® microprocessor, field-programmable gate array (FPGA), application specific integrated circuit (ASIC), application specific processor, or other microprocessor or processing elements.

In FIG. 1, processor 110 provides interface 113. Interface 113 comprises a communication link between processor 110 and any component coupled to PCIe fabric 151, which may comprise a PCIe link. In some examples, this interface may employ Ethernet traffic transported over a PCIe link. Additionally, each processing module 120 in FIG. 1 is configured with driver 141 which may provide for Ethernet communication over PCIe links. Thus, any of processing module 120 and management processor 110 can communicate over Ethernet that is transported over the PCIe fabric. However, implementations are not limited to Ethernet over PCIe and other communication interfaces may be used, including standard PCIe traffic over PCIe interfaces.

A plurality of processing modules 120 are included in platform 100. Each processing module 120 includes one or more CPUs or microprocessors and other processing circuitry that retrieves and executes software, such as driver 141 and any number of end user applications, from an associated storage system. Each processing module 120 can be implemented within a single processing device but can also be distributed across multiple processing devices or sub-systems that cooperate in executing program instructions. Examples of each processing module 120 include general purpose central processing units, application specific processors, and logic devices, as well as any other type of processing device, combinations, or variations thereof. In some examples, each processing module 120 comprises an Intel® or AMD® microprocessor, ARM® microprocessor, graphics processor, compute cores, graphics cores, application specific integrated circuit (ASIC), field-programmable gate array (FPGA), or other microprocessor or processing elements. Each processing module 120 can also communicate with other compute units, such as those in a same storage assembly/enclosure or another storage assembly/enclosure over one or more PCIe interfaces and PCIe fabric 151.

PCIe devices 125 comprise one or more instances of specialized circuitry, ASIC circuitry, or FPGA circuitry, among other circuitry. PCIe devices 125 each include a PCIe interface comprising one or more PCIe lanes. These PCIe interfaces can be employed to communicate over PCIe fabric 151. PCIe devices 125 can include processing components, memory components, storage components, interfacing components, among other components. PCIe devices 125 might comprise PCIe endpoint devices or PCIe host devices which may or may not have a root complex.

When PCIe devices 125 comprise FPGA devices, example implementations can include Xilinx® Alveo™ (U200/U250/U280) devices, or other FPGA devices which include PCIe interfaces. FPGA devices, when employed in PCIe devices 125, can receive processing tasks from another PCIe device, such as a CPU or GPU, to offload those processing tasks into the FPGA programmable logic circuitry. An FPGA is typically initialized into a programmed state using configuration data, and this programmed state includes various logic arrangements, memory circuitry, registers, processing cores, specialized circuitry, and other features which provide for specialized or application-specific circuitry. FPGA devices can be re-programmed to change the circuitry implemented therein, as well as to perform a different set of processing tasks at different points in time. FPGA devices can be employed to perform machine learning tasks, implement artificial neural network circuitry, implement custom interfacing or glue logic, perform encryption/decryption tasks, perform block chain calculations and processing tasks, or other tasks. In some examples, a CPU will provide data to be processed by the FPGA over a PCIe interface to the FPGA. The FPGA can process this data to produce a result and provide this result over the PCIe interface to the CPU. More than one CPU and/or FPGA might be involved to parallelize tasks over more than one device or to serially process data through more than one device.

The management processor 110 may include a configuration data storage, among other configuration data. In some examples, PCIe devices 125 include locally-stored configuration data which may be supplemented, replaced, or overridden using configuration data stored in the configuration data storage. This configuration data can comprise firmware, programmable logic programs, bitstreams, or objects, PCIe device initial configuration data, among other configuration data discussed herein. When PCIe devices 125 include FPGA devices, such as FPGA chips, circuitry, and logic, PCIe devices 125 might also include static random-access memory (SRAM) devices, programmable read-only memory (PROM) devices used to perform boot programming, power-on configuration, or other functions to establish an initial configuration for the FPGA device. In some examples, the SRAM or PROM devices can be incorporated into FPGA circuitry.

A plurality of storage units 130 are included in platform 100. Each storage unit 130 includes one or more storage drives, such as solid state drives in some examples. Each storage unit 130 also includes PCIe interfaces, control processors, and power system elements. Each storage unit 130 also includes an on-sled processor or control system for traffic statistics and status monitoring, among other operations. Each storage unit 130 comprises one or more solid state memory devices with a PCIe interface. In yet other examples, each storage unit 130 comprises one or more separate solid state drives (SSDs) or magnetic hard disk drives (HDDs) along with associated enclosures and circuitry.

A plurality of graphics processing units (GPUs) 170 are included in platform 100. Each GPU comprises a graphics processing resource that can be allocated to one or more compute units. The GPUs can comprise graphics processors, shaders, pixel render elements, frame buffers, texture mappers, graphics cores, graphics pipelines, graphics memory, or other graphics processing and handling elements. In some examples, each GPU 170 comprises a graphics 'card' comprising circuitry that supports a GPU chip. Example GPU cards include nVIDIA® Jetson cards that include graphics processing elements and compute elements, along with various support circuitry, connectors, and other elements. In further examples, other style of graphics processing units or graphics processing assemblies can be employed, such as machine learning processing units, tensor processing units (TPUs), or other specialized processors that may include similar elements as GPUs but lack rendering components to focus processing and memory resources on processing of data.

Network interfaces 140 include network interface cards for communicating over TCP/IP (Transmission Control Protocol (TCP)/Internet Protocol) networks or for carrying user traffic, such as iSCSI (Internet Small Computer System Interface) or NVMe (NVM Express) traffic for storage units 130 or other TCP/IP traffic for processing modules 120. Network interfaces 140 can comprise Ethernet interface equipment, and can communicate over wired, optical, or wireless links. External access to components of platform 100 is provided over packet network links provided by network interfaces 140. Network interfaces 140 communicate with other components of platform 100, such as processing modules 120, PCIe devices 125, and storage units 130 over associated PCIe links and PCIe fabric 151. In some examples, network interfaces are provided for intra-system network communication among for communicating over Ethernet networks for exchanging communications between any of processing modules 120 and management processors 110.

Each PCIe switch 150 communicates over associated PCIe links. In the example in FIG. 1, PCIe switches 150 can be used for carrying user data between PCIe devices 125, network interfaces 140, storage modules 130, and processing modules 120. Each PCIe switch 150 comprises a PCIe cross connect switch for establishing switched connections between any PCIe interfaces handled by each PCIe switch 150. In some examples, each PCIe switch 150 comprises a PLX Technology PEX8725 10-port, 24 lane PCIe switch chip. In other examples, each PCIe switch 150 comprises a PLX Technology PEX8796 24-port, 96 lane PCIe switch chip.

The PCIe switches discussed herein can comprise PCIe crosspoint switches, which logically interconnect various ones of the associated PCIe links based at least on the traffic carried by each PCIe link. In these examples, a domain-based PCIe signaling distribution can be included which allows segregation of PCIe ports of a PCIe switch according to user-defined groups. The user-defined groups can be managed by processor 110 which logically integrate components into associated compute units 160 of a particular cluster and logically isolate components and compute units among different clusters. In addition to, or alternatively from the domain-based segregation, each PCIe switch port can be a non-transparent (NT) or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

Advantageously, this NT port-based segregation or domain-based segregation can allow physical components (i.e. CPU, GPU, storage, network) only to have visibility to those components that are included via the segregation/partitioning. Thus, groupings among a plurality of physical components can be achieved using logical partitioning among the PCIe fabric. This partitioning is scalable in nature, and can be dynamically altered as-needed by a management processor or other control elements. The management processor can control PCIe switch circuitry that comprises the PCIe fabric to alter the logical partitioning or segregation among PCIe ports and thus alter composition of groupings of the physical components. These groupings, referred herein as compute units, can individually form "machines" and can be further grouped into clusters of many compute units/machines. Physical components, such as storage drives, processors, or network interfaces, can be added to or removed from compute units according to user instructions received over a user interface, dynamically in response to loading/idle conditions, or preemptively due to anticipated need, among other considerations discussed herein.

As used herein, unless specified otherwise, domain and partition are intended to be interchangeable and may include similar schemes referred to by one of skill in the art as either domain and partition in PCIe and similar network technology. Further, as used herein, unless specified otherwise, segregating and partitioning are intended to be interchangeable and may include similar schemes referred to by one of skill in the art as either segregating and partitioning in PCIe and similar network technology.

PCIe can support multiple bus widths, such as x1, x2, x4, x8, x16, and x32, with each multiple of bus width comprising an additional "lane" for data transfer. PCIe also supports transfer of sideband signaling, such as System Management Bus (SMBus) interfaces, as well as associated clocks, power, and bootstrapping, among other signaling. PCIe also might have different implementations or versions employed herein. For example, PCIe version 3.0 or later (e.g. 4.0, 5.0, and later) might be employed. Moreover, next-generation interfaces can be employed, such as Cache Coherent Interconnect for Accelerators (CCIX), or Open Coherent Accelerator Processor Interface (OpenCAPI). Also, although PCIe is used in FIG. 1, it should be understood that different communication links or busses can instead be employed, such as NVMe, Ethernet, Serial Attached SCSI (SAS), Gen-Z, FibreChannel, Thunderbolt, Serial Attached ATA Express (SATA Express), among other interconnect, network, and link interfaces. NVMe (NVM Express) is an interface standard for mass storage devices, such as hard disk drives and solid state memory devices. NVMe can supplant serial ATA (SATA) interfaces for interfacing with mass storage devices in personal computers and server environments. However, these NVMe interfaces are limited to one-to-one host-drive relationship, similar to SATA devices. In the examples discussed herein, a PCIe interface can be employed to transport NVMe traffic and present a multi-drive system comprising many storage drives as one or more NVMe virtual logical unit numbers (VLUNs) over a PCIe interface.

Any of the links in FIG. 1 can each use various communication media, such as air, space, metal, optical fiber, or some other signal propagation path, including combinations thereof. Any of the links in FIG. 1 can include any number of PCIe links or lane configurations. Any of the links in FIG. 1 can each be a direct link or might include various equipment, intermediate components, systems, and networks. Any of the links in FIG. 1 can each be a common link, shared link, aggregated link, or may be comprised of discrete, separate links.

In FIG. 1, any processing module 120 has configurable logical visibility to any/all storage units 130, GPU 170, PCIe devices 125, or other physical components of platform 100, as segregated logically by the PCIe fabric. Any processing module 120 can transfer data for storage on any storage unit 130 and retrieve data stored on any storage unit 130. Thus, 'm' number of storage drives can be coupled with 'n' number of processors to allow for a large, scalable architecture with a high-level of redundancy and density. Furthermore, any processing module 120 can transfer data for processing by any GPU 170 or PCIe devices 125, or hand off control of any GPU or FPGA to another processing module 120.

To provide visibility of each processing module 120 to any PCIe device 125, storage unit 130, or GPU 170, various techniques can be employed. In a first example, management processor 110 establishes a cluster that includes one or more compute units 160. These compute units comprise one or more processing modules 120, zero or more PCIe devices 125, zero or more storage units 130, zero or more network interface units 140, and zero or more graphics processing units 170. Elements of these compute units are communicatively coupled by portions of PCIe fabric 151. Once compute units 160 have been assigned to a particular cluster, further resources can be assigned to that cluster, such as storage resources, graphics processing resources, and network interface resources, among other resources. Management processor 110 can instantiate/bind a subset number of the total quantity of storage resources of platform 100 to a particular cluster and for use by one or more compute units 160 of that cluster. For example, 16 storage drives spanning four storage units might be assigned to a group of two compute units 160 in a cluster. The compute units 160 assigned to a cluster then handle transactions for that subset of storage units, such as read and write transactions.

Each compute unit 160, specifically each processor of the compute unit, can have memory-mapped or routing-table based visibility to the storage units or graphics units within that cluster, while other units not associated with a cluster are generally not accessible to the compute units until logical visibility is granted. Moreover, each compute unit might only manage a subset of the storage or graphics units for an associated cluster. Storage operations or graphics processing operations might, however, be received over a network interface associated with a first compute unit that are managed by a second compute unit. When a storage operation or graphics processing operation is desired for a resource unit not managed by a first compute unit (i.e. managed by the second compute unit), the first compute unit uses the memory mapped access or routing-table based visibility to direct the operation to the proper resource unit for that transaction, by way of the second compute unit. The transaction can be transferred and transitioned to the appropriate compute unit that manages that resource unit associated with the data of the transaction. For storage operations, the PCIe fabric is used to transfer data between compute units/processors of a cluster so that a particular compute unit/processor can store the data in the storage unit or storage drive that is managed by that particular compute unit/processor, even though the data might be received over a network interface associated with a different compute unit/processor. For graphics processing operations, the PCIe fabric is used to transfer graphics data and graphics processing commands between compute units/processors of a cluster so that a particular compute unit/processor can control the GPU or GPUs that are managed by that particular compute unit/processor, even though the data might be received over a network interface associated with a different compute unit/processor. Thus, while each particular compute unit of a cluster actually manages a subset of the total resource units (such as storage drives in storage units or graphics processors in graphics units), all compute units of a cluster have visibility to, and can initiate transactions to, any of resource units of the cluster. A managing compute unit that manages a particular resource unit can receive re-transferred transactions and any associated data from an initiating compute unit by at least using a memory-mapped address space or routing table to establish which processing module handles storage operations for a particular set of storage units.

In graphics processing examples, NT partitioning or domain-based partitioning in the switched PCIe fabric can be provided by one or more of the PCIe switches with NT ports or domain-based features. This partitioning can ensure that GPUs can be interworked with a desired compute unit and that more than one GPU, such as more than eight (8) GPUs can be associated with a particular compute unit. Moreover, dynamic GPU-compute unit relationships can be adjusted on-the-fly using partitioning across the PCIe fabric. Shared network resources can also be applied across compute units for graphics processing elements. For example, when a first compute processor determines that the first compute processor does not physically manage the graphics unit associated with a received graphics operation, then the first compute processor transfers the graphics operation over the PCIe fabric to another compute processor of the cluster that does manage the graphics unit.

In further examples, memory mapped direct memory access (DMA) conduits can be formed between individual CPU/PCIe device pairs. This memory mapping can occur over the PCIe fabric address space, among other configurations. To provide these DMA conduits over a shared PCIe fabric comprising many CPUs and GPUs, the logical partitioning described herein can be employed. Specifically, NT ports or domain-based partitioning on PCIe switches can isolate individual DMA conduits among the associated CPUs/GPUs.

In FPGA-based processing examples, NT partitioning or domain-based partitioning in the switched PCIe fabric can be provided by one or more of the PCIe switches with NT ports or domain-based features. This partitioning can ensure that PCIe devices comprising FPGA devices can be interworked with a desired compute unit and that more than one FPGA can be associated with a particular compute unit. Moreover, dynamic FPGA-compute unit relationships can be adjusted on-the-fly using partitioning across the PCIe fabric. Shared network resources can also be applied across compute units for FPGA processing elements. For example, when a first compute processor determines that the first compute processor does not physically manage the FPGA associated with a received FPGA operation, then the first compute processor transfers the FPGA operation over the PCIe fabric to another compute processor of the cluster that does manage the FPGA. In further examples, memory mapped direct memory access (DMA) conduits can be formed between individual CPU/FPGA pairs. This memory mapping can occur over the PCIe fabric address space, among other configurations. To provide these DMA conduits over a shared PCIe fabric comprising many CPUs and FPGAs, the logical partitioning described herein can be employed. Specifically, NT ports or domain-based partitioning on PCIe switches can isolate individual DMA conduits among the associated CPUs/FPGAs.

In storage operations, such as a write operation, data can be received over network interfaces 140 of a particular cluster by a particular processor of that cluster. Load balancing or other factors can allow any network interface of that cluster to receive storage operations for any of the processors of that cluster and for any of the storage units of that cluster. For example, the write operation can be a write operation received over a first network interface 140 of a first cluster from an end user employing an iSCSI protocol or NVMe protocol. A first processor of the cluster can receive the write operation and determine if the first processor manages the storage drive or drives associated with the write operation, and if the first processor does, then the first processor transfers the data for storage on the associated storage drives of a storage unit over the PCIe fabric. The individual PCIe switches 150 of the PCIe fabric can be configured to route PCIe traffic associated with the cluster among the various storage, processor, and network elements of the cluster, such as using domain-based routing or NT ports. If the first processor determines that the first processor does not physically manage the storage drive or drives associated with the write operation, then the first processor transfers the write operation to another processor of the cluster that does manage the storage drive or drives over the PCIe fabric. Data striping can be employed by any processor to stripe data for a particular write transaction over any number of storage drives or storage units, such as over one or more of the storage units of the cluster.

In this example, PCIe fabric 151 associated with platform 100 has 64-bit address spaces, which allows an addressable space of $2^{64}$ bytes, leading to at least 16 exbibytes of byte-addressable memory. The 64-bit PCIe address space can be shared by all compute units or segregated among various compute units forming clusters for appropriate memory mapping to resource units. Individual PCIe switches 150 of the PCIe fabric can be configured to segregate and route PCIe traffic associated with particular clusters among the various storage, compute, graphics processing, and network elements of the cluster. This segregation and routing can be establishing using domain-based routing or NT ports to establish cross-point connections among the various PCIe switches of the PCIe fabric. Redundancy and failover pathways can also be established so that traffic of the cluster can still be routed among the elements of the cluster when one or more of the PCIe switches fails or becomes unresponsive. In some examples, a mesh configuration is formed by the PCIe switches of the PCIe fabric to ensure redundant routing of PCIe traffic.

Management processor 110 controls the operations of PCIe switches 150 and PCIe fabric 151 over one or more interfaces, which can include inter-integrated circuit (I2C) interfaces that communicatively couple each PCIe switch of the PCIe fabric. Management processor 110 can establish NT-based or domain-based segregation among a PCIe address space using PCIe switches 150. Each PCIe switch can be configured to segregate portions of the PCIe address space to establish cluster-specific partitioning. Various configuration settings of each PCIe switch can be altered by management processor 110 to establish the domains and cluster segregation. In some examples, management processor 110 can include a PCIe interface and communicate/configure the PCIe switches over the PCIe interface or sideband interfaces transported within the PCIe protocol signaling.

In some embodiments, while establishing compute unit 160 (e.g. compute unit 160 of domain 'x' of PCIe fabric 151), management processor 110 may configure one or more PCIe switches 150 communicatively coupling the physical components of the domain to provide expanded addressing functionality that may allow for an increased number of devices per domain or per host device. In some cases, a host of compute unit 160 may transfer data to a device of the domain using a host domain address assigned by the host. PCIe fabric 151 may determine a routing for the data transfer through PCIe fabric 151 based on the host domain address. In some examples, the standard addressing functionality may have a maximum number of devices for each host domains. For example, PCIe fabric 151 may utilize a hash table, look up table, or other type of record (hereinafter referred to as "look up table") to associate routes with host domain addresses for each device of the domain. In some cases, the look up table may have a maximum number of records the look up table can store. Some examples including expanded addressing functionality may operate to utilize bits of another field of the data transfer to, for example, select between multiple instances of look up tables to increase the maximum number of devices. For example, the header of a data transfer may include a host domain address, a host port field and a function field. In normal operations, the host port field may operate to select a host port. PCIe fabric 151 may maintain a 256 record table, such as a content addressable memory (CAM), for each host port. The host domain address may be input to the 256 record table to determine an associated route and other information. Thus, in normal operation, the host domain may have a maximum of 256 devices per host port.

In expanded addressing operation, host processor 120, management processor 110 and PCIe fabric 151 may be configured to utilize a portion of a function field to select between multiple look up tables for each host port. For example, two bits of the function field may be used to select between four different CAMs per host port, thus allowing 1024 devices per host port instead of 256. Unless otherwise specified, any discussion herein of an embodiment which includes look up tables on a host port by host port basis may also be applied to embodiments which include a look up table shared across all host ports and vice versa. For example, the use of the expanded addressing bits in an embodiment which utilizes a look up table that is shared across all host ports in normal operation may use the expanded address bits to select between multiple look up tables that is shared across all host ports in expanded addressing operation and any discussion of details thereof may also apply to embodiments which include a look up table for each host port in normal operation.

Management processor 110 may configure the host processor to generate PCIe data traffic using expanded addressing (e.g. using a management driver operating on the host processor) and the PCIe switches to perform monitoring of the PCIe data traffic to trap and route the PCIe data traffic based on expanded addresses. For example, host processor 120 may be configured to assign one or more bits of another field of the PCIe data traffic to select one of multiple tables to store routing information for each PCIe endpoint devices of the domain (e.g. during or following PCIe enumeration and discovery). The look up table filling process may vary. For example, some embodiments may fill a first look up table before utilizing additional look up tables while other embodiments may fill look up tables using a round robin algorithm (e.g. when using look up tables that have lower search efficiency as the look up table becomes fuller).

PCIe switches 150 of PCIe fabric 151 and management processor 110 may establish and populate address traps and look up tables selectable using the expanded address bits to monitor and route data transfers directed to the expanded addresses. Depending on the implementation and use case, the PCIe fabric may operate to utilize expanded addressing for all devices coupled to the host, utilize expanded addressing on a host port by host port basis, selectively utilize expanded addressing functions for non-zero values of the expanded address bits, and so on. In the illustrated example of FIG. 1, management processor 110 may store the multiple look up tables that are selected among using the expanded address bits and may determine routing information after the address traps of the PCIe switches trap a data transfer. As such, after host processor 120 has performed enumeration and discovery, management processor 110 may store, for each host port, a look up table corresponding to each value of the expanded address bits which is populated with routing information of devices assigned that value of the expanded address bits.

The host processor may then issue instructions to the PCIe endpoint devices to perform data transfers as normal data transfers with the exception of utilizing the additional bits of the other header field to convey the expanded address bits. The address traps in the PCIe switches may then detect and route the data transfers to the physical PCIe addresses of the destination PCIe device associated with the host domain address. For example, as discussed above, the management processor may utilize the additional bits of the other header field to select between multiple look up tables. In some examples, the management processor or PCIe switches may also operate to strip out the expanded addressing bits from the other header field.

While the illustrated example utilizes the management processor to store the look up address tables and retrieve routing information for trapped data transfers, in other examples, the PCIe switches may store the look up tables and retrieve the routing information. In other embodiments, the PCIe switches may interact with one or more FPGAs that may be configured to store the look up tables and determine the routing information from the host domain address and expanded address bits. Moreover, other embodiments may include various distributions of the storage and processing associated with the expanded addressing functionality among combinations of the management processor, FPGAs and the PCIe switches. An example implementation in which FPGAs perform routing based on expanded addressing is shown and described with regard to FIGS. 6 and 7.

Management operating system (OS) 111 is executed by management processor 110 and provides for management of resources of platform 100. The management includes creation, alteration, and monitoring of one or more clusters comprising one or more compute units. Management OS 111 provides for the functionality and operations described herein for management processor 110.

Management processor 110 also includes user interface 112, which can present graphical user interface (GUI) 170 to one or more users. User interface 112 and GUI 170 can be employed by end users or administrators to establish clusters, assign assets (compute units/machines) to each cluster. In FIG. 1, GUI 170 allows end users to create and administer clusters as well as assign one or more machine/compute units to the clusters. In some examples, the user interface 112 and GUI 170 allows the end user to determine what portion or scope within the compute unit should have expanded addressing functionality enabled. GUI 170 provides telemetry information for the operation of system 100 to end users, such as in one or more status interfaces or status views. The state of various components or elements of platform 100 can be monitored through GUI 170, such as processor/CPU state, network state, storage unit state, PCIe element state, among others. User interface 112 can provide other user interfaces than GUI 170, such as command line interfaces (CLIs), application programming interfaces (APIs), or other interfaces. In some examples, GUI 170 is provided over a websockets-based interface.

One or more management processors can be included in a system, such as when each management processor can manage resources for a predetermined number of clusters or compute units. User commands, such as those received over a GUI, can be received into any of the management processors of a system and forwarded by the receiving management processor to the handling management processor. Each management processor can have a unique or pre-assigned identifier which can aid in delivery of user commands to the proper management processor. Additionally, management processors can communicate with each other, such as using a mailbox process or other data exchange technique. This communication can occur over dedicated sideband interfaces, such as I2C interfaces, or can occur over PCIe or Ethernet interfaces that couple each management processor.

Management OS 111 also includes emulated network interface 113. Emulated network interface 113 comprises a transport mechanism for transporting network traffic over one or more PCIe interfaces. Emulated network interface 113 can emulate a network device, such as an Ethernet device, to management processor 110 so that management processor 110 can interact/interface with any of processing modules 120 over a PCIe interface as if the processor was communicating over a network interface. Emulated network interface 113 can comprise a kernel-level element or module which allows management OS 111 to interface using Ethernet-style commands and drivers. Emulated network interface 113 allows applications or OS-level processes to communicate with the emulated network device without having associated latency and processing overhead associated with a network stack. Emulated network interface 113 comprises a software component, such as a driver, module, kernel-level module, or other software component that appears as a network device to the application-level and system-level software executed by the processor device.

In the examples herein, emulated network interface 113 advantageously does not require network stack processing to transfer communications. Instead, emulated network interface 113 transfers communications as associated traffic over a PCIe interface or PCIe fabric to another emulated network device. Emulated network interface 113 does not employ network stack processing yet still appears as network device to the operating system of an associated processor, so that user software or operating system elements of the associated processor can interact with emulated network interface 113 and communicate over a PCIe fabric using existing network-facing communication methods, such as Ethernet communications.

Emulated network interface 113 translates PCIe traffic into network device traffic and vice versa. Processing communications transferred to the network device over a network stack is omitted, where the network stack would typically be employed for the type of network device/interface presented. For example, the network device might be presented as an Ethernet device to the operating system or applications. Communications received from the operating system or applications are to be transferred by the network device to one or more destinations. However, emulated network interface 113 does not include a network stack to process the communications down from an application layer down to a link layer. Instead, emulated network interface 113 extracts the payload data and destination from the communications received from the operating system or applications and translates the payload data and destination into PCIe traffic, such as by encapsulating the payload data into PCIe frames using addressing associated with the destination.

Management driver 141 is included on each processing module 120. Management driver 141 can include emulated network interfaces, such as discussed for emulated network interface 113. Additionally, management driver 141 monitors operation of the associated processing module 120 and software executed by a CPU of processing module 120 and provides telemetry for this operation to management processor 110. Thus, any user provided software can be executed by CPUs of processing modules 120, such as user-provided operating systems (Windows, Linux, MacOS, Android, iOS, etc. . . . ) or user application software and drivers. Management driver 141 provides functionality to allow each processing module 120 to participate in the associated compute unit and/or cluster, as well as provide telemetry data to an associated management processor. Each processing module 120 can also communicate with each other over an emulated network device that transports the network traffic over the PCIe fabric. Driver 141 also provides an API for user software and operating systems to interact with driver 141 as well as exchange control/telemetry signaling with management processor 110.

In some examples, management driver 141 may provide an interface to management processor 110 through which management processor 110 may instruct host processor 120 to establish expanded addresses that may comprise combinations of a host domain address of an associated PCIe endpoint device and one or more expanded address bits. As discussed above, the expanded address bits may be used to select between multiple look up tables maintained by the PCIe fabric that store routing information to reach a PCIe device associated with the host domain address. In some cases, the one or more expanded address bits select between multiple look up tables associated with a host port. Driver 141 may also provide functionality for host processor 120 to provide the expanded addressing information to the management processor 110 or the PCIe switches 150 of the PCIe fabric 151 for use in populating address traps. Driver 141, other drivers or software may also provide an API for user software and operating systems to interact with driver 141 to issue data transfer instructions to PCIe endpoints using expanded addressing functionality.

Figure 2:
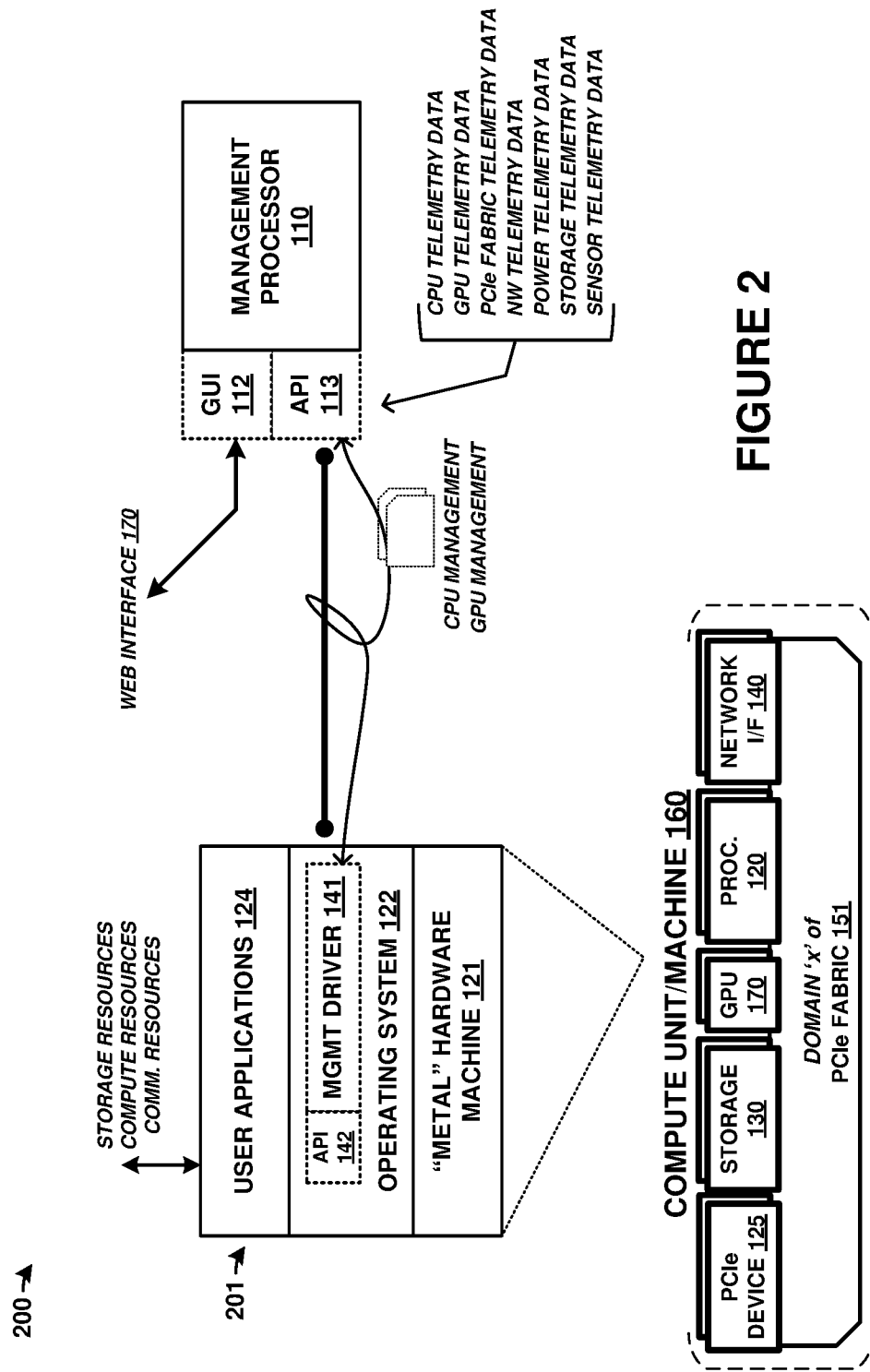
FIG. 2 is a diagram illustrating management of a computing platform in an implementation.

FIG. 2 is a system diagram that includes further details on elements from FIG. 1. System 200 includes a detailed view of an implementation of processing module 120 as well as management processor 110.

In FIG. 2, processing module 120 can be an exemplary processor in any compute unit or machine of a cluster. Detailed view 201 shows several layers of processing module 120. A first layer 121 is the hardware layer or "metal" machine infrastructure of processor processing module 120. A second layer 122 provides the OS as well as management driver 141 and API 142. Finally, a third layer 124 provides user-level applications. View 201 shows that user applications can access storage, processing (CPU, GPU, or FPGA), and communication resources of the cluster, such as when the user application comprises a clustered storage system or a clustered processing system.

As discussed above, driver 141 provides an emulated network device for communicating over a PCIe fabric with management processor 110 (or other processor elements). This may be performed as Ethernet traffic transported over PCIe. In such a case, a network stack is not employed in driver 141 to transport the traffic over PCIe. Instead, driver 141 may appear as a network device to an operating system or kernel to each processing module 120. User-level services/applications/software can interact with the emulated network device without modifications from a normal or physical network device. However, the traffic associated with the emulated network device is transported over a PCIe link or PCIe fabric, as shown. API 113 can provide a standardized interface for the management traffic, such as for control instructions, control responses, telemetry data, status information, or other data.

In addition, management driver 141 may operate as an interface to device drivers of PCIe devices of the compute unit to facilitate an expanded addressing functionality. In the illustrated example, compute unit 160 is configured to allow for expanded addressing data transfers using a portion of another field of the PCIe communication header as expanded address bits. Accordingly, management driver 141 may operate to cause device drivers to utilize the portion of the other field of the PCIe communication header as expanded address bits when communicating with the PCIe devices of the compute unit. For example, when a user application or the operating system requests a data transfer to a PCIe device, management driver 141 may operate to interface with and issue commands to the device drivers of the PCIe devices such that the portion of the other field of the PCIe communication header is utilized to convey as expanded address bits.

Control elements within corresponding PCIe switch circuitry are configured to monitor for PCIe communications belonging to compute units using expanded addressing functionality. As discussed above, different implementations and use cases may have expanded addressing functionality enabled for different portions or scopes of the compute unit and the address traps may be differently configured to reflect the enabled portion or scope of the compute unit. Data transfers "trapped" by the PCIe switch circuitry are then routed to a destination PCIe device using the expanded addressing functionality discussed herein.

An enumeration process discovers the PCIe devices able to communicate with the host processor, and initializes the PCIe devices in the host processor for later interaction over a corresponding PCIe interface. This enumeration process also includes the host processor assigning a base address register (BAR) and address range or space within a system memory space of the host processor. This BAR and address range is used for memory mapped access to the PCIe device, and does not typically correspond to physical memory or RAM coupled to the host processor. When applications desire to interface with the PCIe device, such as GPU, these applications typically interact with an API or interface of the device driver. The application can issue commands through the API for handling by the PCIe device, such as reads, writes, data transfers, data processing commands, status information requests, configuration changes, or other commands. When the expanded addressing functionality is enabled, the enumeration process may further include assigning values for one or more expanded address bits. As previously mentioned, during operation, the values for one or more expanded address bits may be used to select between multiple look up tables in the PCIe fabric; thereby allowing for an increased maximum number of devices.

Figure 3:
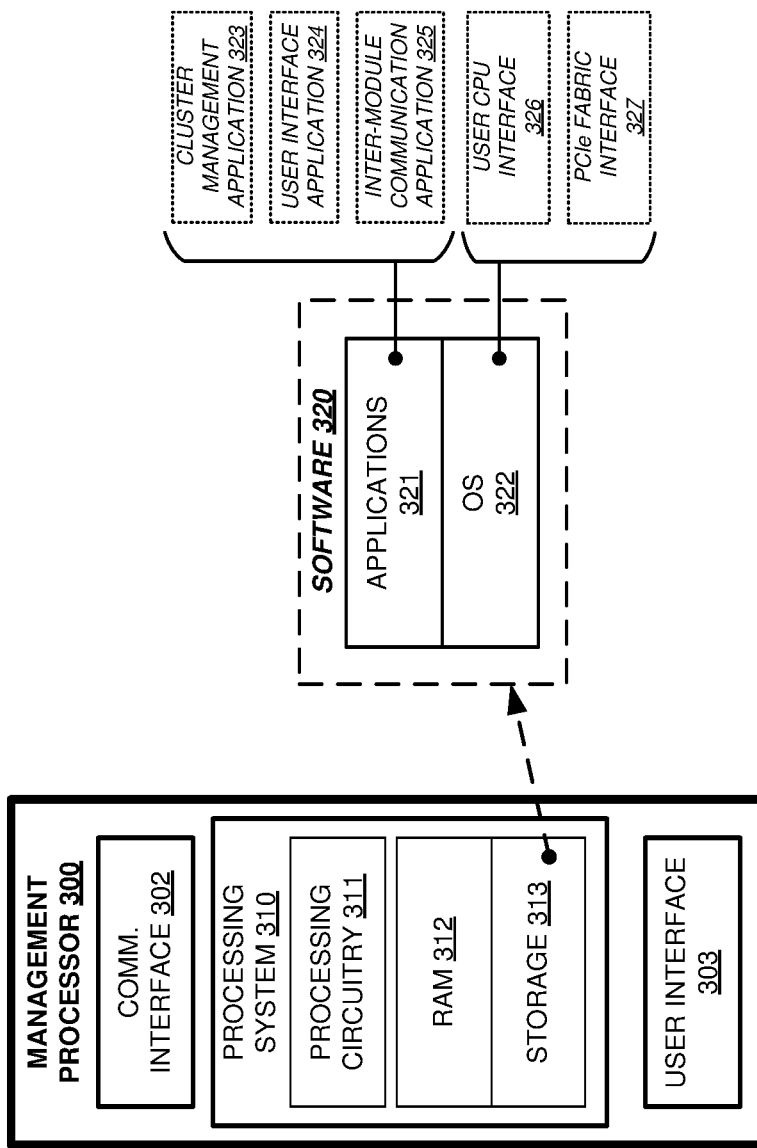
FIG. 3 is a block diagram illustrating a management processor in an implementation.

FIG. 3 is a block diagram illustrating management processor 300. Management processor 300 illustrates an example of any of the management processors discussed herein, such as processor 110 of FIG. 1. Management processor 300 includes communication interface 302, user interface 303, and processing system 310. Processing system 310 includes processing circuitry 311, random access memory (RAM) 312, and storage 313, although further elements can be included.

Processing circuitry 311 can be implemented within a single processing device but can also be distributed across multiple processing devices or sub-systems that cooperate in executing program instructions. Examples of processing circuitry 311 include general purpose central processing units, microprocessors, application specific processors, and logic devices, as well as any other type of processing device. In some examples, processing circuitry 311 includes physically distributed processing devices, such as cloud computing systems.

Communication interface 302 includes one or more communication and network interfaces for communicating over communication links, networks, such as packet networks, the Internet, and the like. The communication interfaces can include PCIe interfaces, Ethernet interfaces, serial interfaces, serial peripheral interface (SPI) links, inter-integrated circuit (I2C) interfaces, universal serial bus (USB) interfaces, UART interfaces, wireless interfaces, or one or more local or wide area network communication interfaces which can communicate over Ethernet or Internet protocol (IP) links. Communication interface 302 can include network interfaces configured to communicate using one or more network addresses, which can be associated with different network links. Examples of communication interface 302 include network interface card equipment, transceivers, modems, and other communication circuitry.

User interface 303 may include a touchscreen, keyboard, mouse, voice input device, audio input device, or other touch input device for receiving input from a user. Output devices such as a display, speakers, web interfaces, terminal interfaces, and other types of output devices may also be included in user interface 303. User interface 303 can provide output and receive input over a network interface, such as communication interface 302. In network examples, user interface 303 might packetize display or graphics data for remote display by a display system or computing system coupled over one or more network interfaces. Physical or logical elements of user interface 303 can provide alerts or visual outputs to users or other operators. User interface 303 may also include associated user interface software executable by processing system 310 in support of the various user input and output devices discussed above. Separately or in conjunction with each other and other hardware and software elements, the user interface software and user interface devices may support a graphical user interface, a natural user interface, or any other type of user interface.

RAM 312 and storage 313 together can comprise a non-transitory data storage system, although variations are possible. RAM 312 and storage 313 can each comprise any storage media readable by processing circuitry 311 and capable of storing software and OS images. RAM 312 can include volatile and nonvolatile, removable and non-removable media implemented in any method or technology for storage of information, such as computer readable instructions, data structures, program modules, or other data. Storage 313 can include non-volatile storage media, such as solid state storage media, flash memory, phase change memory, or magnetic memory, including combinations thereof. RAM 312 and storage 313 can each be implemented as a single storage device but can also be implemented across multiple storage devices or sub-systems. RAM 312 and storage 313 can each comprise additional elements, such as controllers, capable of communicating with processing circuitry 311.

Software stored on or in RAM 312 or storage 313 can comprise computer program instructions, firmware, or some other form of machine-readable processing instructions having processes that when executed a processing system direct management processor 300 to operate as described herein. For example, software 320 can drive management processor 300 to receive user commands to establish clusters comprising compute blocks among a plurality of physical computing components that include processing modules, storage modules, and network modules. Software 320 can drive management processor 300 to receive and monitor telemetry data, statistical information, operational data, and other data to provide telemetry to users and alter operation of clusters according to the telemetry data or other data. Software 320 can drive management processor 300 to manage cluster and compute/graphics unit resources, establish domain partitioning or NT partitioning among PCIe fabric elements, and interface with individual PCIe switches, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

System software 320 illustrates a detailed view of an example configuration of RAM 312. It should be understood that different configurations are possible. System software 320 includes applications 321 and operating system (OS) 322. Software applications 323-327 each comprise executable instructions which can be executed by management processor 300 for operating a cluster controller or other circuitry according to the operations discussed herein.

Specifically, cluster management application 323 establishes and maintains clusters and compute units among various hardware elements of a computing platform, such as seen in FIG. 1. User interface application 324 provides one or more graphical or other user interfaces for end users to administer associated clusters and compute units and monitor operations of the clusters and compute units. Intermodule communication application 325 provides communication among other management processor 300 elements, such as over I2C, Ethernet, emulated network devices, or PCIe interfaces. User CPU interface 326 provides communication, APIs, and emulated network devices for communicating with processors of compute units, and specialized driver elements thereof. PCIe fabric interface 327 establishes various logical partitioning or domains among PCIe switch elements, controls operation of PCIe switch elements, and receives telemetry from PCIe switch elements. PCIe fabric interface 327 also establishes address traps or address redirection functions within a PCIe fabric. PCIe fabric interface 327 can interface with one or more PCIe switch circuitry elements to establish address ranges which are monitored and redirected, thus forming address traps in the PCIe fabric. As discussed above, management processor 300 may operate to store the look up tables associated with the expanded addressing functionality and to retrieve routing information from the look up tables for trapped data transfers.

Software 320 can reside in RAM 312 during execution and operation of management processor 300, and can reside in storage system 313 during a powered-off state, among other locations and states. Software 320 can be loaded into RAM 312 during a startup or boot procedure as described for computer operating systems and applications. Software 320 can receive user input through user interface 303. This user input can include user commands, as well as other input, including combinations thereof.

Storage system 313 can comprise flash memory such as NAND flash or NOR flash memory, phase change memory, magnetic memory, among other solid state storage technologies. As shown in FIG. 3, storage system 313 includes software 320. As described above, software 320 can be in a non-volatile storage space for applications and OS during a powered-down state of management processor 300, among other operating software.

Management processor 300 is generally intended to represent a computing system with which at least software 320 is deployed and executed in order to render or otherwise implement the operations described herein. However, management processor 300 can also represent any computing system on which at least software 320 can be staged and from where software 320 can be distributed, transported, downloaded, or otherwise provided to yet another computing system for deployment and execution, or yet additional distribution.

The systems and operations discussed herein provide for dynamic assignment of computing resources, graphics processing resources, network resources, or storage resources to a computing cluster. The compute units are disaggregated from any particular cluster or compute unit until allocated by users of the system. Management processors can control the operations of the cluster and provide user interfaces to the cluster management service provided by software executed by the management processors. A cluster includes at least one "machine" or computing unit, while a compute unit include at least a processor element. Computing units can also include network interface elements, graphics processing elements, and storage elements, but these elements are not required for a computing unit.

Processing resources and other elements (graphics processing, network, storage, FPGA, or other) can be swapped in and out of computing units and associated clusters on-the-fly, and these resources can be assigned to other computing units or clusters. In one example, graphics processing resources can be dispatched/orchestrated by a first computing resource/CPU and subsequently provide graphics processing status/results to another compute unit/CPU. In another example, when resources experience failures, hangs, overloaded conditions, then additional resources can be introduced into the computing units and clusters to supplement the resources.

Processing resources can have unique identifiers assigned thereto for use in identification by the management processor and for identification on the PCIe fabric. User supplied software such as operating systems and applications can be deployed to processing resources as-needed when the processing resources are initialized after adding into a compute unit, and the user supplied software can be removed from a processing resource when that resource is removed from a compute unit. The user software can be deployed from a storage system that the management processor can access for the deployment. Storage resources, such as storage drives, storage devices, and other storage resources, can be allocated and subdivided among compute units/clusters. These storage resources can span different or similar storage drives or devices, and can have any number of logical units (LUNs), logical targets, partitions, or other logical arrangements. These logical arrangements can include one or more LUNs, iSCSI LUNs, NVMe targets, or other logical partitioning. Arrays of the storage resources can be employed, such as mirrored, striped, redundant array of independent disk (RAID) arrays, or other array configurations can be employed across the storage resources. Network resources, such as network interface cards, can be shared among the compute units of a cluster using bridging or spanning techniques. Graphics resources (e.g. GPUs) or FPGA resources can be shared among more than one compute unit of a cluster using NT partitioning or domain-based partitioning over the PCIe fabric and PCIe switches.

Figure 4:
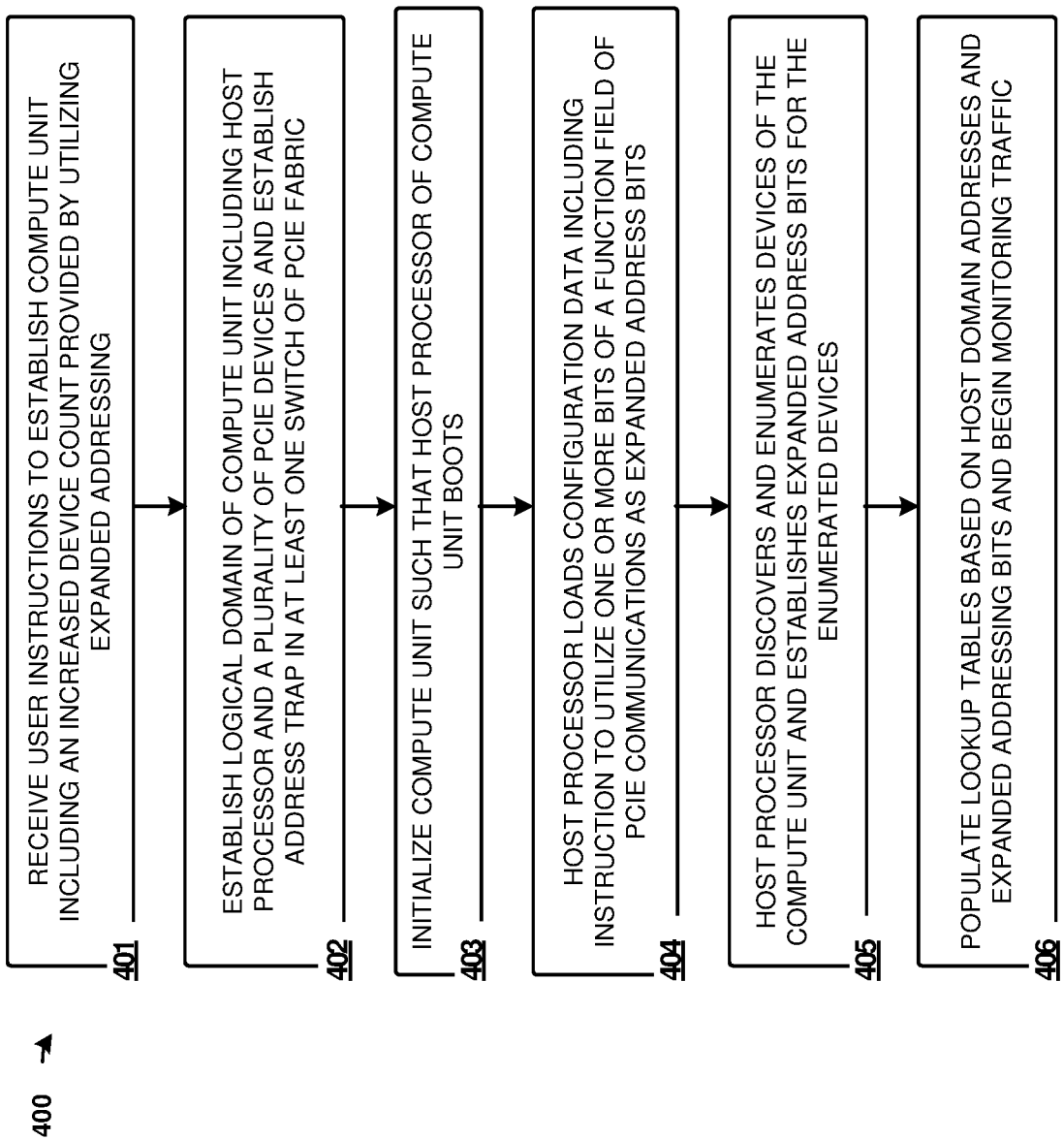
FIG. 4 includes a flow diagram that illustrates an operational example of expanded addressing functionality in compute units in an implementation.
Figure 5:
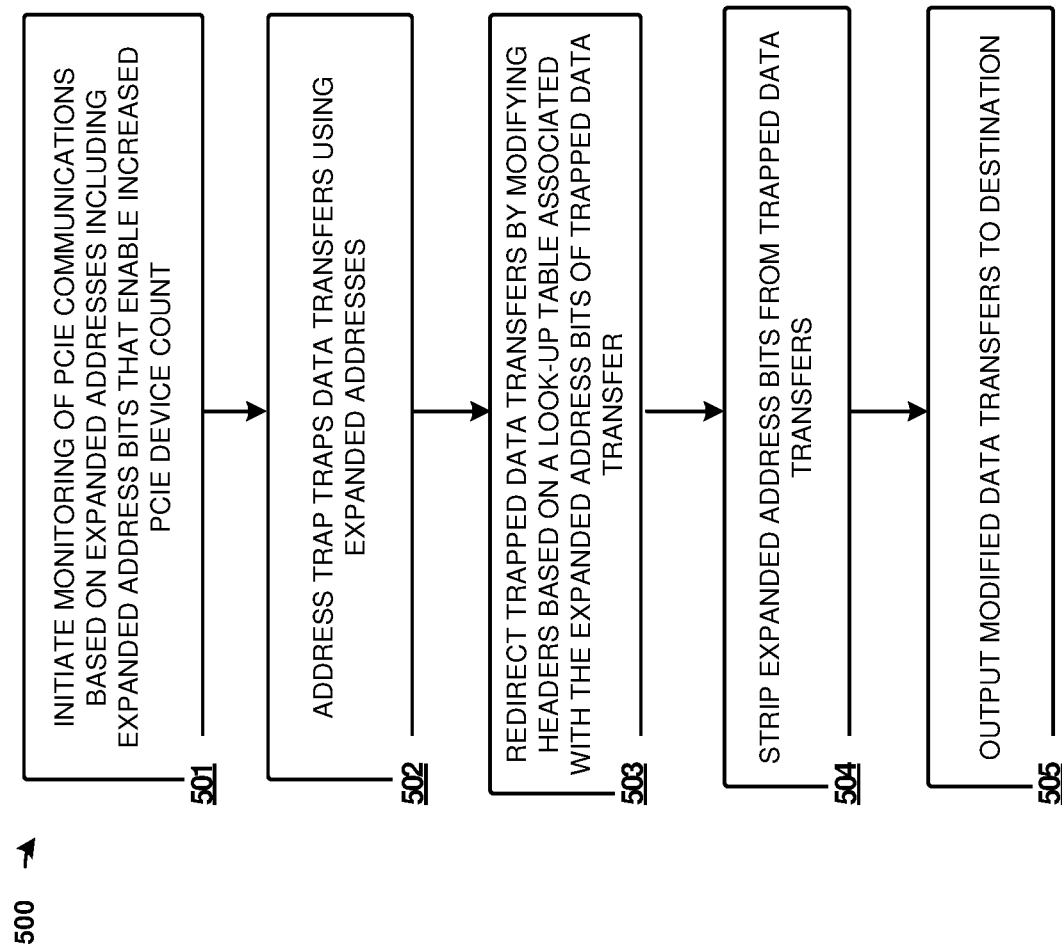
FIG. 5 includes a flow diagram that illustrates an operational example of expanded addressing functionality in compute units in an implementation.
Figure 6:
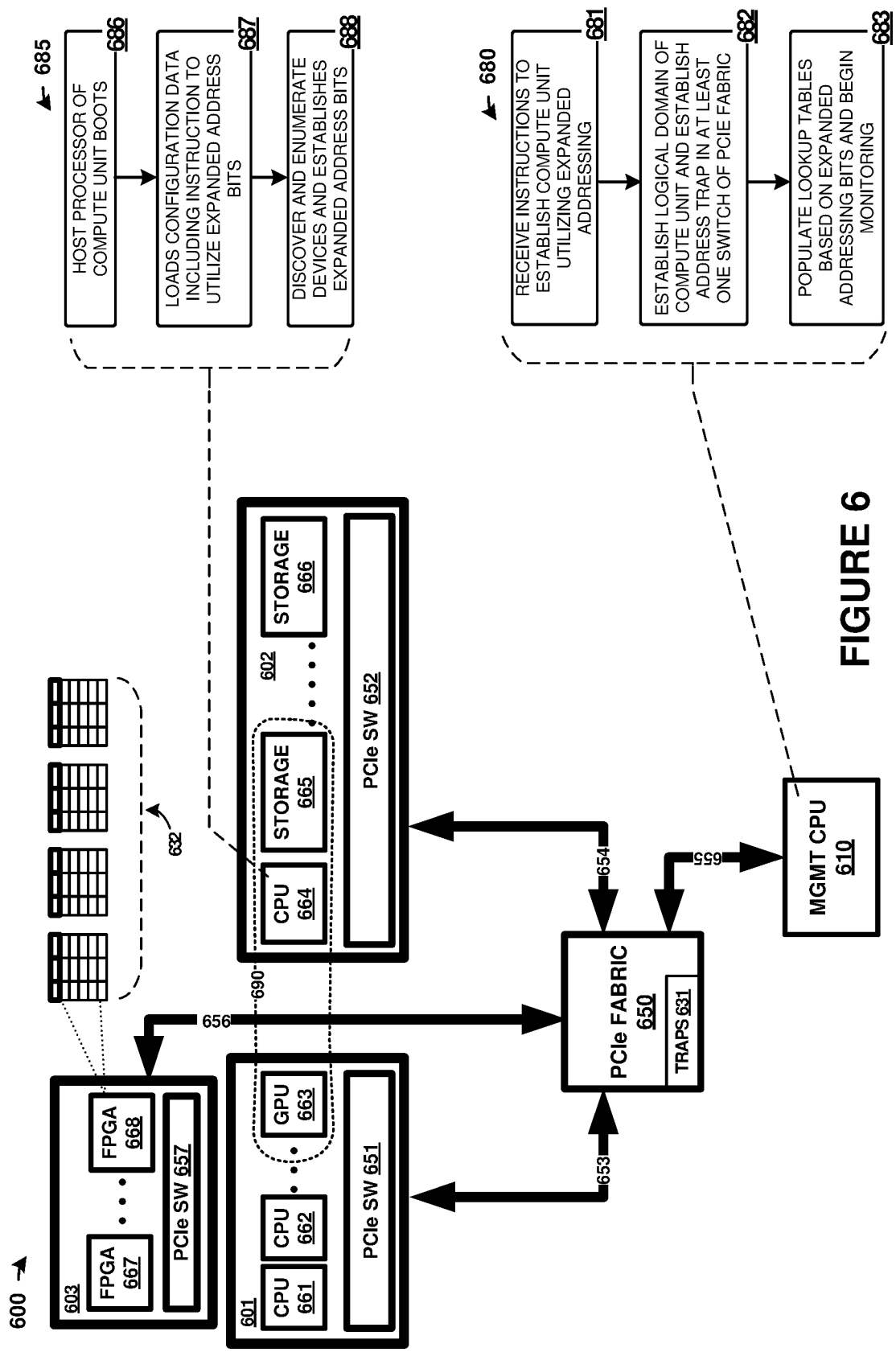
FIG. 6 is a diagram illustrating components of a computing platform in an implementation.
Figure 7:
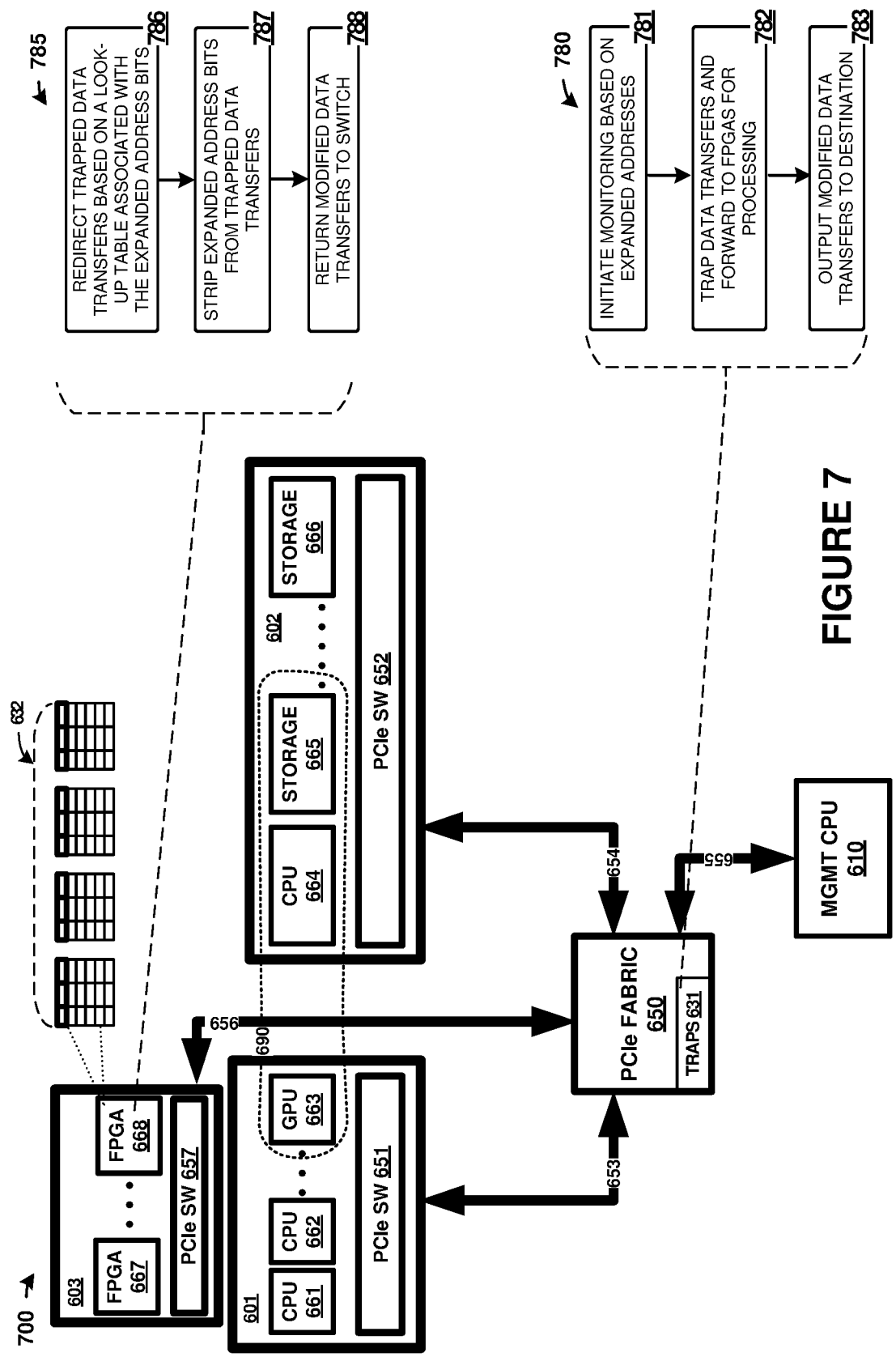
FIG. 7 is a diagram illustrating components of a computing platform in an implementation.

As previously discussed, in some examples, the computing platform may provide for expanded addressing functionality for compute units. Expanded addressing operations are discussed herein. FIGS. 4-5 provide flow diagrams for use in platforms and systems which may provide for expanded addressing functionality in compute units. FIGS. 6 and 7 illustrate the operation of the flow diagrams of FIGS. 4 and 5 in the context of computing platforms.

FIG. 4 includes a flow diagram that illustrates an operational example of expanded addressing functionality in compute units for any of the systems discussed herein, such as for platform 100 of FIG. 1, system 200 of FIG. 2, or processor 300 of FIG. 3. In FIG. 4, operations will be discussed in context of elements of FIGS. 1 and 2, although the operations can also apply to those in FIG. 3.

Management processor 110 may receive (401) user instructions to establish a compute unit including an increased device count by utilizing expanded addressing functionality. For example, the user instructions may be received via a graphical user interface (GUI) or command line interface (CLI) as part of user instructions to establish a cluster or may be received in instructions to establish a specific compute unit. In some examples, the user instructions may specify the use of expanded addressing for all devices in a cluster, all devices coupled to a host, specify the use of expanded addressing on a host port by host port basis, and so on.

Upon receiving the user instructions to establish the compute unit, management processor 110 may establish (402) a logical PCIe domain that includes host processor 120 and a plurality of PCIe devices (e.g. storage devices, GPUs, NICs, FPGAs, etc.). Various examples for establishing logical domains in PCIe and similar communication systems are discussed above. Referring to previous examples, this may operate to add devices into the logical domain from the free pool of devices. Establishing a logical PCIe domain may provide PCIe physical layer visibility between the PCIe devices of the domain. While establishing the logical domain, the management processor 110 may further establish one or more address traps in the PCIe fabric. These one or more address traps are established within at least one PCIe switch within the PCIe fabric. Depending on the implementation, the PCIe fabric may already have an address trap function enabled or management processor 110 may enable the functionality while establishing the logical domain. Once the address trap functionality is enabled, management processor 110 may configure the PCIe fabric such that the address trap functionality is prepared to be populated by a control process or management driver executed by the host processor.

Management processor 110 may then initialize (403) the compute unit such that the host processor of the compute unit boots and begins to operate.

Host processor 120 may then load (404) configuration data including instructions to utilize expanded addressing functionality. In the illustrated example, the configuration data instructs the host processor to utilize one or more bits of a function field of PCIe communications as expanded address bits. For example, the configuration data may specify the number of bits of the function field to be utilized as expanded addressing bits, a range of values allowed for the expanded addressing bits, which host ports to enable expanded addressing functionality for, and so on.

Host processor 120 may discover and enumerate (405) PCIe devices in the logical domain of the compute unit, establish system memory address ranges for each discovered/enumerated PCIe device and establish values for expanded address bits of each discovered/enumerated PCIe device. The system memory address ranges are provided for memory mapped access to the PCIe devices, such as by applications executed on the host processor. Typically, a base address register (BAR) will be established for each PCIe device enumerated and an accompanying address range will be assigned starting from that base address. This enumeration and address assignment process can be performed by various elements of a host processor, such as boot software/firmware, or instead may be handled by basic input/output system (BIOS) circuitry or functionality, among other elements associated with the host processor. As mentioned above, during the enumeration, management driver 141 may assign values to expanded addressing bits for each discovered/enumerated PCIe device which may be used during operation to allow for an increased maximum number of PCIe endpoint devices within the host domain. The manner in which values for the expanded addressing bits are assigned to devices may vary. Some examples may utilize a round robin algorithm. Other examples may assign the same expanded addressing bit value to discovered/enumerated PCIe devices until a maximum number of devices per expanded addressing bit value is reached.

Management processor 110 then can use the host domain addresses and expanded addressing bits to populate (406) address traps and look up tables to establish the expanded addressing functionality. For example, management processor 110 may populate control circuitry or control elements within various PCIe switches of the PCIe fabric to establish the address traps and may establish and populate look-up tables (LUTs). A LUT may be established for each value of the expanded addressing bits and then populated with a record for each PCIe device assigned the associated expanded addressing bit. These LUTs indicate relationships between the host domain addresses (for each destination PCIe device assigned the corresponding expanded addressing bit value) and routing information to reach the corresponding destination PCIe devices through the PCIe fabric. In examples in which address traps are established separately for each host port during normal operation, each port may have a LUT corresponding to each value of the expanded addressing bits when utilizing expanded addressing functionality. Further, in examples in which PCIe switches, FPGAs or other additional processing resources are utilized in handling the expanded addressing functionality, the LUTs may reside in the PCIe switches, the FPGAs or the other additional processing resources.

FIG. 5 provides an example flow diagram for the handling of a data transfer in a compute unit established according to FIG. 4.

FIG. 5 includes a flow diagram that illustrates an operational example of expanded addressing functionality in compute units for any of the systems discussed herein, such as for platform 100 of FIG. 1, system 200 of FIG. 2, or processor 300 of FIG. 3. In FIG. 5, operations will be discussed in context of elements of FIGS. 1 and 2, although the operations can also apply to those in FIG. 3.

In FIG. 5, the devices of the PCIe fabric initiate (501) monitoring of PCIe communications based on expanded addresses including expanded address bits that enable increased PCIe device count.

An address trap of the PCIe fabric detects and traps (502) a data transfer of a host domain using expanded addressing functionality. Depending on the implementation, the expanded address bits may be received within a portion of a field of the data transfers other than the host domain address field.

In some examples, the address trap or a PCIe switch including the address trap may perform the functions discussed below. In other examples, the address trap may forward the trapped data transfer to the management processor, a FPGA or other additional processing resource for handling of the expanded addressing functionality.

At 503, the trapped data transfer may be redirected by modifying headers of the data transfer and/or encapsulating the data transfer using routing information determined based on the expanded address bits of the trapped data transfer. For example, a look up table corresponding to the value of the expanded address bits may be selected using the value of the expanded address bits. Routing information for the trapped data transfer may be determined from the selected look up table based on the host domain address and/or other header fields of the trapped data transfer. The expanded address bits of the trapped data transfer may be stripped (504) from the headers thereof. Some examples herein may strip the expanded address bits from the trapped data transfer to allow the destination PCIe device to operate without modification from normal operation. For example, if the two most significant bits of the PCIe function field is utilized to store the expanded address bits, a binary value of three (3) in the two most significant bits will result in the PCIe function field referencing the wrong functions or functions which do not exist for endpoints that interpret the PCIe function field normally. As such, stripping out the expanded address bits by setting the bits to zero (e.g. the default or base value of the bits) may avoid additional requirements on endpoint devices included in compute units using expanded addressing functionality.

The modified data transfers may then be output (505) to the destination device, for example, using the routing information from the look up table.

FIGS. 6 and 7 illustrate the operation of the processes discussed above with regard to FIGS. 4 and 5 in the context of computing platforms 600 and 700 utilizing FPGAs to conduct expanded addressing functionality. For sake of brevity, the entire discussion of the processes of FIGS. 4-5 will not be repeated and the discussion of FIGS. 4-5 may be used for additional details for the operations discussed with regard to FIGS. 6 and 7.

FIG. 6 is presented to illustrate an example of the operation of the process discussed above with regard to FIG. 4 in the context of a computing platform. In FIG. 6, computing platform 600 is presented and performs operations 680 and 685. Computing platform 600 includes a management CPU 610, PCIe fabric 650, as well assemblies 601-603 that house a plurality of associated CPUs, GPUS and storage devices 661-666, a plurality of FPGA devices 667-668, as well as a PCIe switches 651-652 and 657. Assemblies 601-603 might comprise any chassis, rackmount or "just a box of disks" (JBOD) or "just a bunch of logic" (JBOL) assemblies. A number of PCIe links interconnect the elements of FIG. 6, namely PCIe links 653-656. In some examples, PCIe link 655 may comprise a special control/management link that enables administrative or management-level access of control to PCIe fabric 650. However, it should be understood that similar links to the other PCIe links can instead be employed. The switches of the PCIe fabric 650 may each include one or more address traps 631. PCIe switches 651 and 652 may also include address traps (not shown herein for ease of illustration and comprehension).

The address traps 631 comprise an address monitoring portion and, depending on the implementation, a redirection portion. The address monitoring portion monitors PCIe frames or other PCIe traffic to determine if data transfers from a compute unit utilizing expanded addressing functionality are encountered. If data transfers from a compute unit utilizing expanded addressing functionality are encountered, then the address traps forwards the PCI traffic to a FPGA device. The FPGA devices 667-668 may include redirection portions of the address trap. For example, the FPGA devices may use the expanded address bits to select a look up table 632 associated with the value of the expanded addressing bits of the forwarded data transfer. In some implementations, the look up tables of the address traps may comprise "content addressable memories" (CAMs). The FPGA devices may then use the host domain address to determine routing information stored in the selected look up table for the destination device. The FPGA may then strip the expanded addressing bits from the forwarded data transfers and encapsulate or modify the data transfers using the routing information from the look up table and return the data transfers to the PCI fabric 650. The PCIe fabric 650 then outputs the modified data transfers for delivery to the destination using the routing information.

Turning to the operation of the computing platform 600, the management CPU 610 may perform the operations 680 while the Host CPU 664 may perform operations 685. As discussed below, these operations interact to establish a compute unit with expanded addressing functionality.

In operation 681, the management CPU 610 may receive user instructions to establish a compute unit including an increased device count by utilizing expanded addressing functionality.

In operation 682, the management CPU 610 may establish a logical domain 690 for the compute unit. This may include allocating physical resources for the compute unit including GPU 663, CPU 664 and storage device 665. The management CPU 610 may then establish the logical domain for the allocated physical resources of the compute unit including GPU 663, CPU 664 and storage device 665. While establishing the logical domain, management CPU 610 may further establish one or more address traps 631 in the PCIe fabric. These one or more address traps are established within at least one PCIe switch within the PCIe fabric and at least one FPGA 667-668. In particular, the management CPU 610 may establish address traps 631 and look up tables 632 to provide expanded addressing functionality for the compute unit once it is initialized. Once the address trap functionality is established, management processor 610 may configure the PCIe fabric such that the address trap functionality is prepared to be populated by a control process or management driver executed by the host processor.

The operations then turn to operations 685 of host CPU 664. In operation 686, host CPU 664 of the compute unit boots and begins to operate.

In operation 687, host processor 664 may then load configuration data including instruction to utilize expanded addressing functionality. In the illustrated example, the configuration data instructs the host processor to utilize one or more bits of a function field of PCIe communications as expanded address bits. For example, the configuration data may specify the number of bits of the function field to be utilized as expanded addressing bits, a range of values allowed for the expanded addressing bits, which host ports to enable expanded addressing functionality for, and so on.

In operation 688, host processor 664 may discover and enumerate PCIe devices in the logical domain of the compute unit and establish values for expanded address bits of each discovered/enumerated PCIe device. In the current example, the host processor 664 discovers and enumerates GPU 663, storage unit 665 and PCIe switches 651-652 along with other devices of the domain (not shown). During the enumeration, the host CPU 664 may establish system memory address ranges for each discovered/enumerated PCIe device of the compute unit. As mentioned above, during the enumeration, the management driver of host processor 664 may assign values to expanded addressing bits for each discovered/enumerated PCIe device which may be used during operation to allow for an increased maximum number of PCIe endpoint devices within the host domain. The manner in which values for the expanded addressing bits are assigned to devices may vary. Some examples may utilize a round robin algorithm. Other examples may assign the same expanded addressing bit value to discovered/enumerated PCIe devices until a maximum number of device per expanded addressing bit value is reached.

In operation 683, management CPU 610 can use the host domain addresses and expanded addressing bits to populate address traps 631 (including look up tables 632) in the PCIe switches of the PCIe fabric 650 to establish the expanded addressing functionality. In some examples, the management CPU 610 may populate the address traps by creating address look-up tables (LUTs) 632 for each value of the expanded addressing bits. The address look-up tables (LUTs) 632 may then be populated with a record for each PCIe device assigned the associated expanded addressing bit. These LUTs 632 indicate relationships between the host domain addresses (for each destination PCIe device assigned the corresponding expanded addressing bit value) and routing information to reach the corresponding destination PCIe devices through the PCIe fabric. In examples in which address traps are established separately for each host port during normal operation, each port may have LUTs 632 corresponding to each value of the expanded addressing bits when utilizing expanded addressing functionality. Further, in examples in which the management CPU, FPGAs or other additional processing resources are utilized in handling the expanded addressing functionality (shown in FIG. 6 as handled by the FPGAs), the LUTs 632 may reside in the management CPU, FPGAs or other additional processing resources. In other examples, the LUTs 632 may reside in the PCIe switches of the PCIe fabric 650.

FIG. 7 is presented to illustrate an example of the operation of the process discussed above with regard to FIG. 5 in the context of a computing platform utilizing FPGAs to conduct expanded addressing functionality. In FIG. 7, computing platform 700 is presented and performs operations 780 and 785, which follow operation 683 of FIG. 6.

In operation 781, address traps 631 of PCIe fabric 650 initiate monitoring of PCIe communications based on expanded addresses including expanded address bits that enable increased PCIe device count.

In operation 782, address trap 631 of the PCIe fabric 650 detects and traps a data transfer of a host domain using expanded addressing functionality. Address trap 631 may forward the trapped data transfer to a FPGA 668 for handling of the expanded addressing functionality. Depending on the implementation, the expanded address bits may be received within a portion of a field of the data transfers other than the host domain address. In some examples, the field of the data transfers other than the host domain address may be the PCIe function field.

In operation 786, FPGA 668 may redirect the trapped data transfer by modifying headers of the data transfer and/or encapsulating the data transfer using routing information determined based on the expanded address bits of the trapped data transfer. For example, the FPGA may select a look up table 632 corresponding to the value of the expanded address bits of the trapped data transfer. The FPGA may then determine routing information for the trapped data transfer from the selected look up table 632 based on the host domain address and/or other header fields of the trapped data transfer.

In operation 787, the FPGA may strip the expanded address bits of the trapped data transfer from the headers thereof. Some examples herein may strip the expanded address bits from the trapped data transfer to allow the destination PCIe device to operate without modification from normal operation. Stripping out the expanded address bits by setting the bits to zero (e.g. the default or base value of the bits) may avoid additional requirements on endpoint devices included in compute units using expanded addressing functionality.

In operation 788, the FPGA 668 may return the modified data transfers to the switch of PCIe fabric 650 whose trap 631 trapped the data transfers. In operation 783, the switch of PCIe fabric 650 may then output the modified data transfer to the destination device, for example, using the routing information from the selected look up table 632.

Many variations of the above processes can be achieved. For example, while the address traps are configured when establishing the compute unit and populated following a boot procedure in the above examples, other examples may configure and populate the address traps after the host processor boots. For example, the management processor may configure the host processor to establish the expanded addressing values and establish and populate the address traps, without intervention of the management processor other than the initial instructions to the host processor.

In other examples, the compute unit may not be established using expanded addressing functionality. For example, as additional devices may be added to compute units during operation, the management driver of the host processor may determine that additional devices cannot be added during normal operation. In such a case, the management driver of the host processor may initiate expanded addressing operations by adding at least on additional look up table associated with a non-zero expanded addressing bit value. The management driver may further interface with the management processor to cause the PCIe fabric to begin utilizing expanded addressing functionality for the domain.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the present disclosure. Those skilled in the art will also appreciate that the features described above can be combined in various ways to form multiple implementations. As a result, the invention is not limited to the specific implementations described above, but only by the claims and their equivalents.

What is claimed is:

1. A computing system comprising:
    a management processor configured to initiate a peripheral component interconnect express (PCIe) arrangement between a host processor and a plurality of PCIe devices over a PCIe fabric comprising one or more PCIe switches;
    wherein the PCIe arrangement is established to detect a data transfer directed to an expanded address of a greater length than a destination field of PCIe communications of the detected data transfer by using at least another portion of the PCIe communications to store a portion of the expanded address that is in excess of the length than the destination field of the PCIe communications, and route the detected data transfer over the PCIe fabric to a destination device associated with the expanded address.

2. The computing system of claim 1, wherein the detected data transfer is initiated by a request originated by an application executed by the host processor.

3. The computing system of claim 1, wherein the other portion of the PCIe communications that stores the portion of the expanded address that is in excess of the length of the destination field of the PCIe communications is a portion of PCIe function field.

4. The computing system of claim 3, wherein the routing of the detected data transfer includes clearing the portion of the PCIe function field that stores the portion of the expanded address that is in excess of the length of the destination field of the PCIe communications such that the PCIe arrangement is transparent to the destination device.

5. The computing system of claim 1, wherein the routing of the detected data transfer includes clearing the other portion of the PCIe communications that stores the portion of the expanded address that is in excess of the length of the destination field of the PCIe communications.

6. The computing system of claim 1, wherein the routing of the detected data transfer is performed at least in part by a field-programmable gate array (FPGA) coupled to a PCIe switch of the one or more PCIe switches using a plurality of look up tables that are each associated with a respective value of the expanded address bits.

7. The computing system of claim 1, wherein redirecting is performed at least in part by a field-programmable gate array (FPGA) coupled to a PCIe switch of the one or more PCIe switches using the portion of the expanded address that is in excess of the length of the destination field of the PCIe communications to select one of a plurality of look up tables and inputting a portion of the expanded address stored in the destination field of the PCIe communications as a key to the selected look up table.

8. A method of operating a data system, the method comprising:
    monitoring peripheral component interconnect express (PCIe) traffic over a PCIe fabric comprising one or more PCIe switches to detect a data transfer from a host processor to an expanded address including a host domain address of a destination device and expanded address bits;
    selecting a look up table (LUT) associated with a value of the expanded address bits;
    determining, from the selected LUT, routing data that is associated with the host domain address; and
    outputting the detected data transfer to the destination device associated with the host domain address using the determined routing data.

9. The method of claim 8, wherein each value of the expanded address bits is associated with a corresponding LUT of a plurality of LUTs.

10. The method of claim 8, wherein the expanded address bits are stored in a portion of a PCIe function field of the detected data transfer.

11. The method of claim 10, further comprising:
    clearing the portion of the PCIe function field of the detected data transfer that stores the expanded address bits prior to the outputting of the detected data transfer to the destination device.

12. The method of claim 8, further comprising:
    wherein the selecting of the look up table (LUT) and the determining of the routing data are performed at least in part by a field-programmable gate array (FPGA) coupled to a PCIe switch of the one or more PCIe switches; and
    the FPGA uses the expanded address bits to select the selected LUT from among a plurality of LUTs and uses the host domain address of the detected data transfer as a key to the selected LUT.

13. The method of claim 12, wherein each LUT of the plurality of LUTs is a content addressable memory (CAM).

14. The method of claim 8, wherein each host port of the host processor is associated with a plurality of LUTs that are each associated with a value of the expanded address bits.

15. A computing apparatus comprising:
    one or more non-transitory computer readable storage media;
    a host processor operatively coupled with the one or more non-transitory computer readable storage media; and
    program instructions stored on the one or more non-transitory computer readable storage media, that when executed by the host processor, direct the host processor to at least:
    receive a request to initiate a peripheral component interconnect express (PCIe) data transfer to a destination PCIe device over a PCIe fabric comprising one or more PCIe switches providing expanded addressing functionality;
    responsive to the request, initiate the requested PCIe data transfer directed to the destination PCIe device using at least an expanded address comprising a host domain address of the destination PCIe device and expanded address bits associated with the destination PCIe device;
    wherein a value of the expanded address bits is associated with a look up table (LUT) of a plurality of LUTs maintained by the PCIe fabric that store routing information; and
    each value of the expanded address bits is associated with a respective LUT of the plurality of LUTs maintained by the PCIe fabric.

16. The computing apparatus of claim 15, wherein the request to initiate the PCIe data transfer is originated by an application executed on the host processor.

17. The computing apparatus of claim 15, wherein the host processor enumerates one or more devices of a compute unit including the destination PCIe device and establishes the expanded address bits for the enumerated devices.

18. The computing apparatus of claim 17, wherein the host processor establishes the expanded address bits for the enumerated devices based on instructions from management processor.

19. The computing apparatus of claim 17, wherein the host processor provides the expanded addresses comprising the host domain address and expanded address bits of the enumerated devices to the PCIe fabric to populate the plurality of LUTs.

20. The computing apparatus of claim 15, wherein the host processor utilizes a plurality of the most significant bits of a PCIe function field of the PCIe data transfers to transmit the expanded address bits.

* * * * *